United States Patent
Bahirat et al.

(10) Patent No.: US 7,016,141 B2
(45) Date of Patent: Mar. 21, 2006

(54) SETTLE, ROTATIONAL/LINEAR VIBRATION, AND TRACK FOLLOW CONTROLLER OPTIMIZATION WITH SHARED STATE CONTROLLER

(75) Inventors: Shirish Dnyaneshware Bahirat, Longmont, CO (US); Brent Jay Harmer, Johnstown, CO (US)

(73) Assignee: Seagate Technology LLC, Scotts Valley, CA (US)

(*) Notice: Subject to any disclaimer, the term of this patent is extended or adjusted under 35 U.S.C. 154(b) by 89 days.

(21) Appl. No.: 10/690,945

(22) Filed: Oct. 22, 2003

(65) Prior Publication Data

US 2005/0088774 A1 Apr. 28, 2005

(51) Int. Cl.
*G11B 5/596* (2006.01)

(52) U.S. Cl. .................... 360/77.02; 360/77.04
(58) Field of Classification Search .............. 360/75, 360/77.02, 77.04, 77.07, 78.04, 78.06, 78.07, 360/78.09
See application file for complete search history.

(56) References Cited

U.S. PATENT DOCUMENTS

| | | |
|---|---|---|
| 3,590,734 A | 7/1971 | Carter |
| 5,668,680 A | 9/1997 | Tremaine |
| 5,880,902 A | 3/1999 | Yu et al. |
| 6,101,058 A | 8/2000 | Morris |
| 6,185,171 B1 | 2/2001 | Bassett et al. |
| 6,243,226 B1 * | 6/2001 | Jeong ................. 360/78.07 |
| 6,499,022 B1 | 12/2002 | Dittmar et al. |
| 6,545,957 B1 | 4/2003 | Hiraga et al. |
| 6,583,964 B1 | 6/2003 | Huang et al. |
| 6,690,537 B1 * | 2/2004 | Kagami et al. ........ 360/78.06 |
| 2002/0034036 A1 | 3/2002 | Sri-Jayantha et al. |
| 2002/0093754 A1 | 7/2002 | Zhang et al. |

FOREIGN PATENT DOCUMENTS

JP 60-76037 4/1985

* cited by examiner

*Primary Examiner*—Andrew L. Sniezek
(74) *Attorney, Agent, or Firm*—David K. Lucente; Derek J. Berger

(57) ABSTRACT

A shared state controller is provided that optimizes for settle, rotational vibration, and track following. The shared state controller uses the same state update equation with different output equations for settle and track follow. Two or more different track follow output equations may also be used. Switching logic determines which output equation to use in the controller. The shared state controller switches between a settle controller and a track follow controller based on the state of the actuator. In addition, the shared state controller may also switch between two or more track follow controllers based upon other parameters.

20 Claims, 6 Drawing Sheets

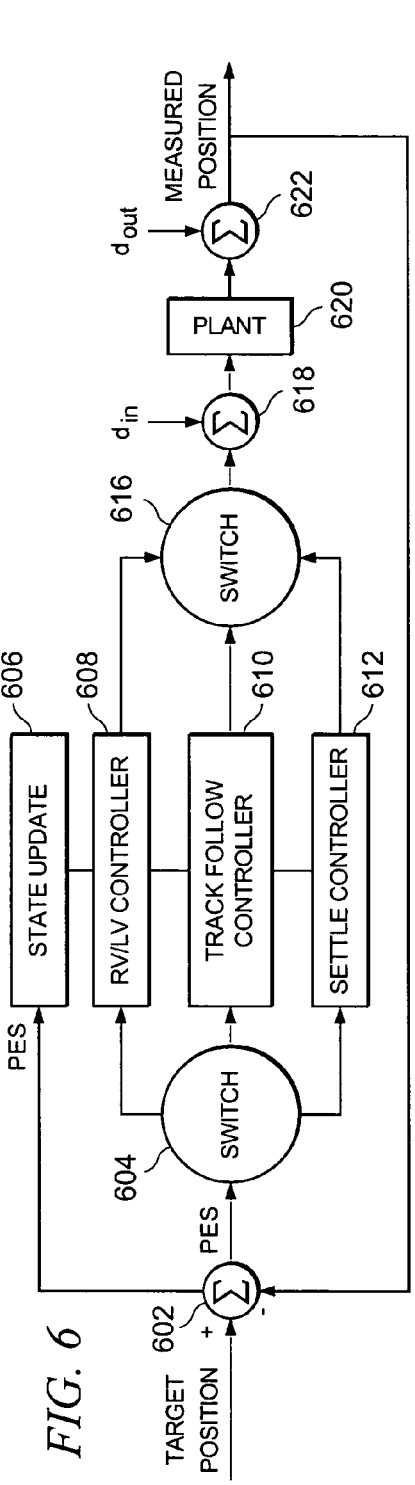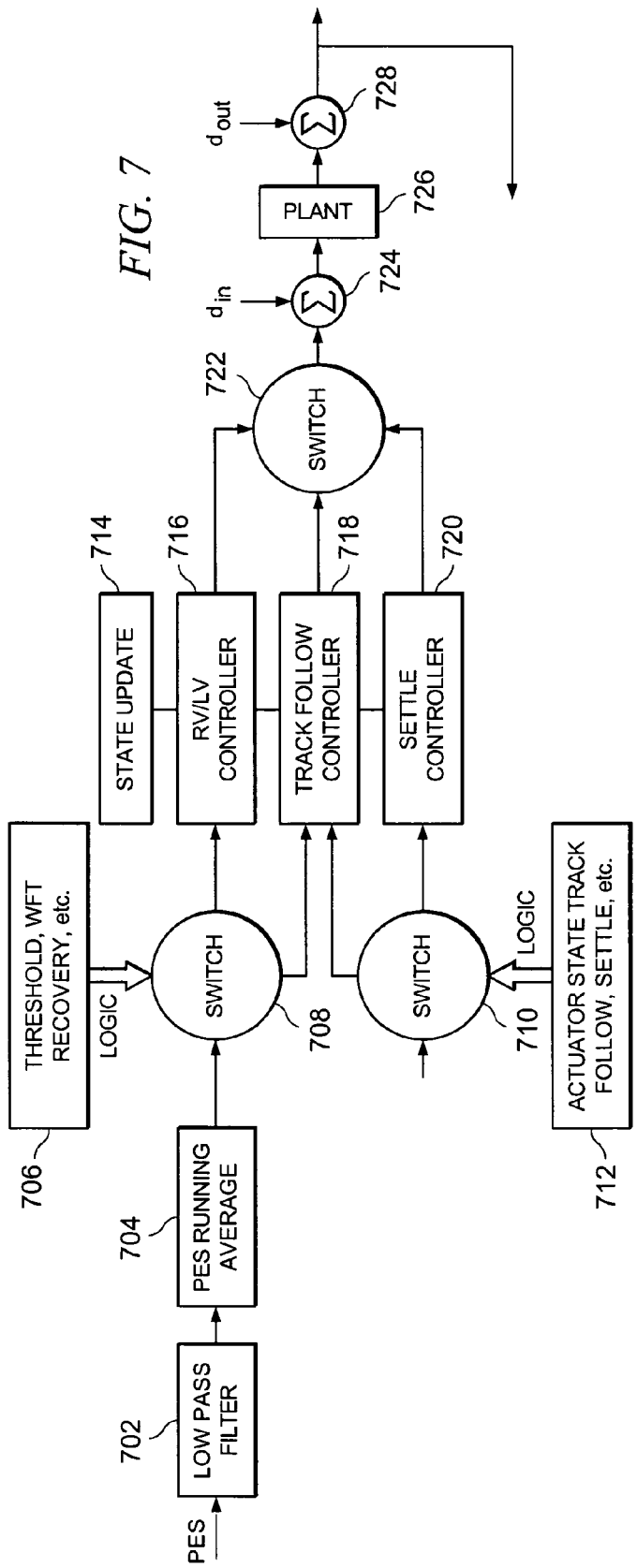

SETTLE, ROTATIONAL/LINEAR VIBRATION, AND TRACK FOLLOW CONTROLLER OPTIMIZATION WITH SHARED STATE CONTROLLER

FIELD OF THE INVENTION

The present invention relates generally to the field of seek and track follow controllers in a disc drive. More particularly, the present invention relates to optimizing seek and track follow with a shared state controller.

BACKGROUND OF THE INVENTION

Disc drives are commonly used in workstations, personal computers, laptops, and other computer systems to store large amounts of data in a form that can be made readily available to a user. In general, a disc drive comprises a magnetic disc that is rotated by a spindle motor. The surface of the disc is divided into a series of data tracks. The data tracks are spaced radially from one another across a band having an inner diameter and an outer diameter.

Each of the data tracks extends generally circumferentially around the disc and can store data in the form of magnetic transitions within the radial extent of the track on the disc surface. An interactive element, such as a magnetic transducer, is used to sense the magnetic transitions to read data, or to transmit an electric signal that causes a magnetic transition on the disc surface, to write data. The magnetic transducer includes a read/write gap that contains the active elements of the transducer at a position suitable for interaction with the magnetic surface of the disc. The radial dimension of the gap fits within the radial extent of the data track containing the transitions so that only transitions of the single track are transduced by the interactive element when the interactive element is properly centered over the respective data track.

The magnetic transducer is mounted by a head structure to a rotary actuator arm and is selectively positioned by the actuator arm over a preselected data track of the disc to either read data from or write data to the preselected data track of the disc, as the disc rotates below the transducer. The actuator arm is, in turn, mounted to a voice coil motor that can be controlled to move the actuator arm across the disc surface.

A servo system is typically used to control the position of the actuator arm to insure that the head is properly centered over the magnetic transitions during either a read or write operation. In a known servo system, servo position information is recorded on the disc surface between written data blocks, and periodically read by the head for use in a closed loop control of the voice coil motor to position the actuator arm. Such a servo arrangement is referred to as an embedded servo system.

In modern disc drive architectures utilizing an embedded servo, each data track is divided into a number of data sectors for storing fixed sized data blocks, one per sector. Associated with the data sectors are a series of servo sectors, generally equally spaced around the circumference of the data track. The servo sectors can be arranged between data sectors or arranged independently of the data sectors such that the servo sectors split data fields of the data sectors.

Each servo sector contains magnetic transitions that are arranged relative to a track centerline such that signals derived from the transitions can be used to determine head position. For example, the servo information can comprise two separate bursts of magnetic transitions, one recorded on one side of the track centerline and the other recorded on the opposite side of the track centerline. Whenever a head is over a servo sector, the head reads each of the servo bursts and the signals resulting from the transduction of the bursts are transmitted to, e.g., a microprocessor within the disc drive for processing.

When the head is properly positioned over a track centerline, the head will straddle the two bursts, and the strength of the combined signals transduced from the burst on one side of the track centerline will equal the strength of the combined signals transduced from the burst on the other side of the track centerline. The microprocessor can be used to subtract one burst value from the other each time a servo sector is read by the head. When the result is zero, the microprocessor will know that the two signals are equal, indicating that the head is properly positioned.

If the result is other than zero, then one signal is stronger than the other, indicating that the head is displaced from the track centerline and overlying one of the bursts more than the other. The magnitude and sign of the subtraction result can be used by the microprocessor to determine the direction and distance the head is displaced from the track centerline, and generate a control signal to move the actuator back towards the centerline.

Each servo sector also contains encoded information to uniquely identify the specific track location of the head. For example, each track can be assigned a unique number, which is encoded using a Gray code and recorded in each servo sector of the track. The Gray code information is used in conjunction with the servo bursts to control movement of the actuator arm when the arm is moving the head in a seek operation from a current track to a destination track containing a data field to be read or written.

The head structure also includes a slider having an air bearing surface that causes the transducer to fly above the data tracks of the disc surface due to fluid currents caused by rotation of the disc. Thus, the transducer does not physically contact the disc surface during normal operation of the disc drive to minimize wear at both the head and disc surface. The amount of distance that the transducer flies above the disc surface is referred to as the "fly height." By maintaining the fly height of the head at an even level regardless of the radial position of the head, it is ensured that the interaction of the head and magnetic charge stored on the media will be consistent across the disc.

When writing or reading information, the hard disc drive may perform a seek routine to move the transducers from one cylinder (track) to another cylinder. During the seek routine the voice coil motor is excited with a current to move the transducers to the new cylinder location on the disc surfaces. The controller also performs a servo routine to insure that the transducer moves to the correct cylinder location, and is at the center of the track. This servo routine is typically comprised of two primary algorithms: a seek control algorithm and a track following control algorithm. The seek control algorithm is used to rapidly move the read/write head of the disc drive to a desired track on the disc. The track following control algorithm is used to control the position and velocity of the read/write head so that the head remains over the center of the desired track.

The track follow control algorithm is optimized based on certain performance characteristics. For example, track follow requirements are typically driven by rotational vibration (RV) performance. Rotary vibrations and linear vibrations (LV) are caused by external vibration conditions, due to the disk drive being bumped or moved, for example. It is accepted that optimization for RV and LV compromises other performance parameters, such as non-repeatable runout (NRRO). Repeatable runout (RRO) occurs because the track is not perfectly circular. Non-repeatable runout occurs because of some external disturbance. Thus, the track follow control loop may be tuned to achieve optimum RV performance and compromise NRRO, for example.

Settle performance depends on the track follow controller. Thus, there is no independent settle controller optimization. Switching from settle to track follow can involve a proportional integrator derivative (PID) controller. A PID controller requires blending, which results in a transient, delay, additional millions of instructions per second (MIPS), and additional memory requirements.

The present invention provides a solution to this and other problems, and offers other advantages over previous solutions.

SUMMARY OF THE INVENTION

The present invention recognizes the disadvantages of the prior art and relates to a shared state controller, which solves the above-mentioned problems.

In accordance with an exemplary embodiment of the invention, a shared state controller is provided that optimizes for settle, rotational/linear vibration, and track following. The shared state controller uses the same state update equation with different output equations for settle and track follow. Two or more different track follow output equations may also be used. For example, one output equation may optimize for NRRO while another output equation optimizes for RV. Switching logic determines which output equation to use in the controller. The shared state controller switches between a settle controller and a track follow controller based on the state of the actuator. In addition, the shared state controller may also switch between two or more track follow controllers based upon other parameters.

The present invention also can be implemented as a computer-readable program storage device which tangibly embodies a program of instructions executable by a computer system to perform the shared state controller. In addition, the invention also can be implemented as a controller itself.

These and various other features as well as advantages which characterize the present invention will be apparent upon reading of the following detailed description and review of the associated drawings.

BRIEF DESCRIPTION OF THE DRAWINGS

FIG. 6 depicts a control diagram for a shared state settle, track follow controller in accordance with a preferred embodiment of the present invention.

FIG. 7 depicts a control diagram for switching in a shared state settle, track follow controller in accordance with an exemplary embodiment of the present invention.

FIGS. 10-1, 10-2, and 10-3 are exemplary diagrams illustrating the output change versus tracking error.

DETAILED DESCRIPTION

The present invention is directed to a mechanism for controlling the transition from seek control to track following control during a seek operation of a disc drive system. As such, in order to provide a context in which the present invention may be implemented, a brief description of the disc drive system is provided with reference to FIGS. 1 and 2.

Figure 1:
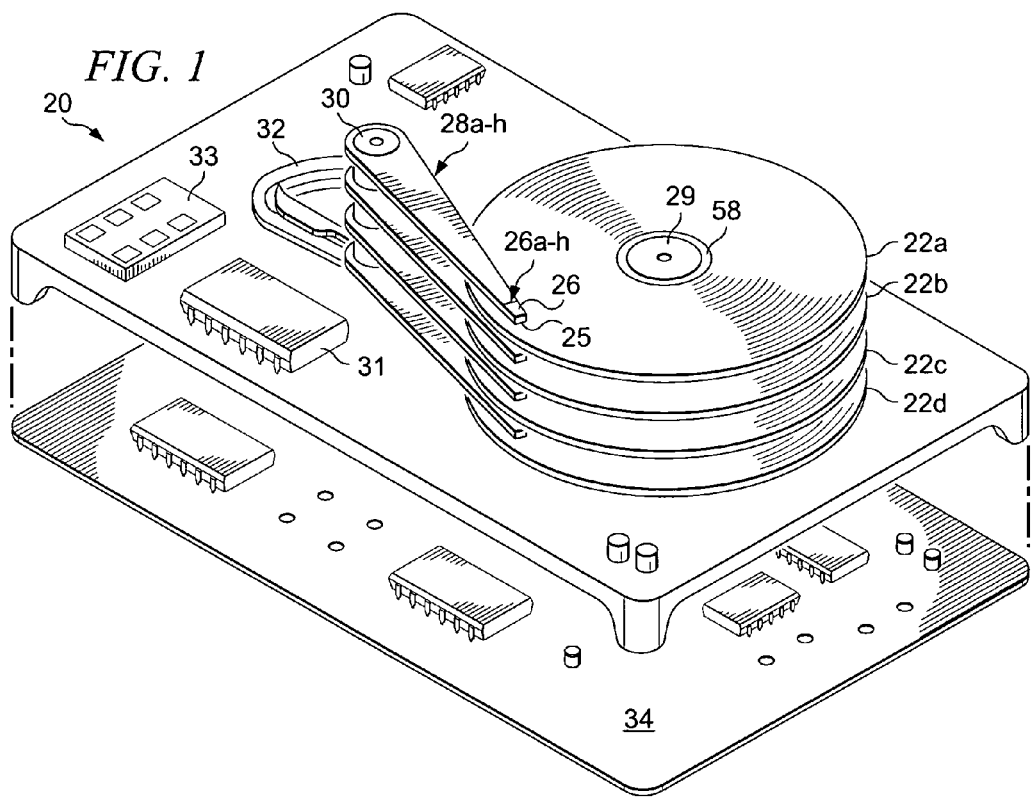
FIG. 1 is an exemplary diagram of a disc drive in accordance with the present invention.
Figure 2:
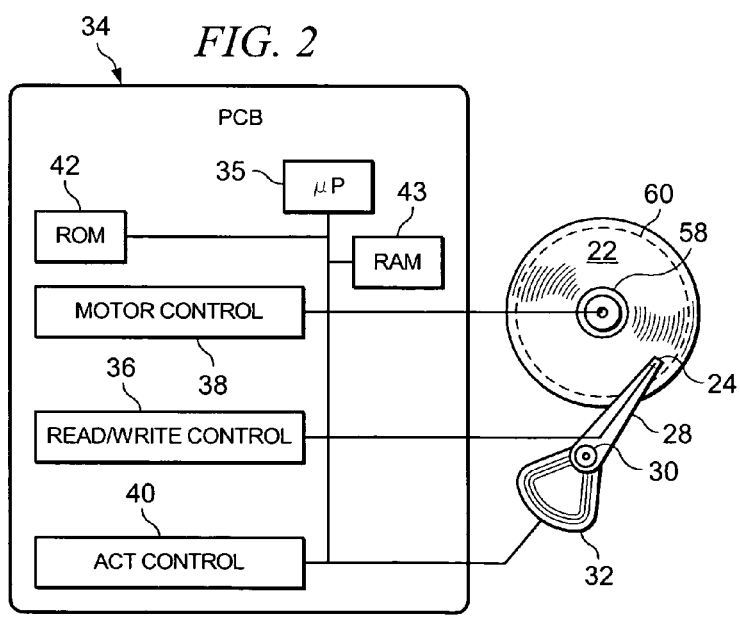
FIG. 2 is an exemplary block diagram of a printed circuit board and its electrical couplings in accordance with the present invention.

Referring now to the drawings, and initially to FIG. 1, there is illustrated an example of a disc drive designated generally by the reference numeral 20. The disc drive 20 includes a stack of storage discs 22a–d and a stack of read/write heads 24a–h. Each of the storage discs 22a–d is provided with a plurality of data tracks to store user data. As illustrated in FIG. 2, one head is provided for each surface of each of the discs 22a–d such that data can be read from or written to the data tracks of all of the storage discs. The heads are coupled to a pre-amplifier 31. It should be understood that the disc drive 20 is merely representative of a disc drive system utilizing the present invention and that the present invention can be implemented in a disc drive system including more or less storage discs.

The storage discs 22a–d are mounted for rotation by a spindle motor arrangement 29, as is known in the art. Moreover, the read/write heads 24a–h are supported by respective actuator arms 28a–h for controlled positioning over preselected radii of the storage discs 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disc surfaces.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. As typically utilized in disc drive systems, the sliders 26 cause the magnetic transducers 25 of the read/write heads 24a–h to "fly" above the surfaces of the respective storage discs 22a–d for non-contact operation of the disc drive system, as discussed above. When not in use, the voice coil motor 32 rotates the actuator arms 28a–h during a contact stop operation, to position the read/write heads 24a–h over a respective landing zone 58 or 60, where the read/write heads 24a–h come to rest on the storage disc surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h via the pre-amplifier 31, to control the transfer of data to and from the data tracks of the storage discs 22a–d. The manner for coupling the PCB 34 to the various components of the disc drive is well known in the art, and includes a connector 33 to couple the read/write channel circuitry to the pre-amplifier 31.

Referring now to FIG. 2, there is illustrated in schematic form of the PCB 34 and the electrical couplings between the control electronics on the PCB 34 and the components of the disc drive system described above. A microprocessor 35 is coupled to each of a read/write control 36, spindle motor control 38, actuator control 40, ROM 42 and RAM 43. In modern disc drive designs, the microprocessor can comprise a digital signal processor (DSP). The microprocessor 35 sends data to and receives data from the storage discs 22a–d via the read/write control 36 and the read/write heads 24a–h.

The microprocessor 35 also operates according to instructions stored in the ROM 42 to generate and transmit control signals to each of the spindle motor control 38 and the actuator control 40. The spindle motor control 38 is responsive to the control signals received from the microprocessor 35 to generate and transmit a drive voltage to the spindle motor 29 to cause the storage discs 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage discs 22a–d. The magnitude and polarity of the voltage generated by the actuator control 40, as a function of the microprocessor control signals, determines the radial direction and radial speed of the read/write heads 24a–h.

When data to be written or read from one of the storage discs 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, a multiplexer (not shown) is used to couple the head 24a–h over the specific data track to be written or read, to the read/write control 36, as is generally known in the art. The read/write control 36 includes a read channel that, in accordance with modern disc drive design, comprises an electronic circuit that detects information represented by magnetic transitions recorded on the disc surface within the radial extent of the selected data track. As described above, each data track is divided into a number of data sectors.

During a read operation, electrical signals transduced by the head from the magnetic transitions of the data sectors are input to the read channel of the read/write control 36 for processing via the pre-amplifier 31. The RAM 43 can be used to buffer data read from or to be written to the data sectors of the storage discs 22a–d via the read/write control 36. The buffered data can be transferred to or from a host computer utilizing the disc drive for data storage.

Figure 3:
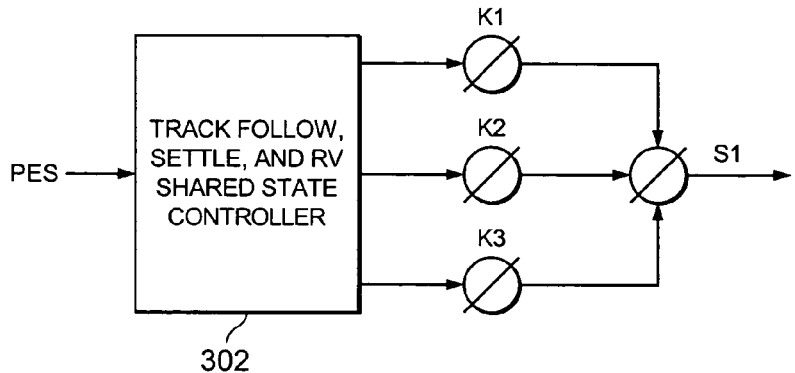
FIG. 3 is an illustration of a shared state controller in accordance with an exemplary embodiment of the present invention.

FIG. 3 is an illustration of a shared state controller in accordance with an exemplary embodiment of the present invention. Track follow, settle, and rotational vibration (RV) controller 302 shares a single state, or vector of states, for seamless track follow to settle switch. By way of illustration, knob K1 represents tuning for optimum settle performance, knob K2 represents tuning for optimum track follow performance, and knob K3 represents tuning for optimum RV performance. Switch S1 determines which output will be used. Shared state controller 302 develops an ability to tune settle without affecting track follow performance and also to independently optimize for RV or any other performance parameter.

Figure 4:
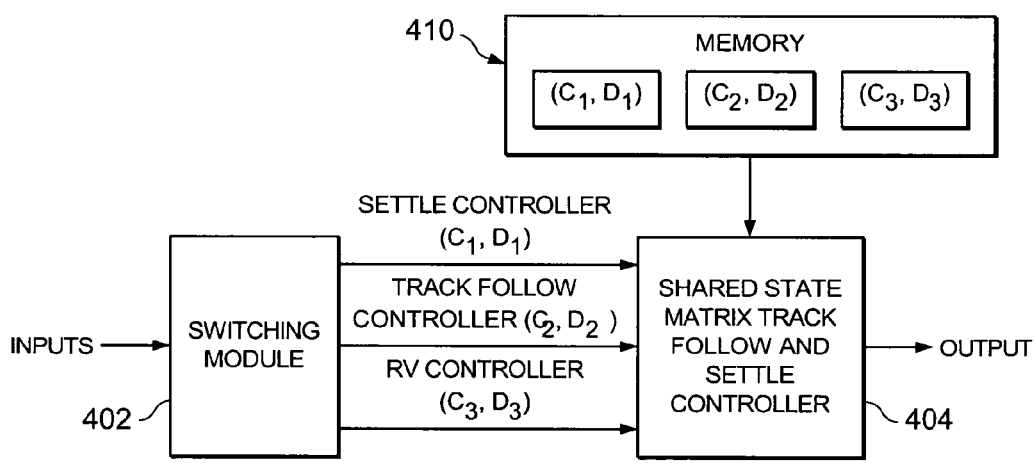
FIG. 4 is a block diagram illustrating a shared state track follow and settle controller in accordance with an exemplary embodiment of the present invention.

FIG. 4 is a block diagram illustrating a shared state track follow and settle controller in accordance with an exemplary embodiment of the present invention. Inputs are received by switching module 402. Inputs may include, for example, a position error signal (PES), actuator states, threshold seek write fault threshold (WFT) recovery, and the like. Switching module 402 determines an output for shared state matrix track follow and settle controller 404.

Controller 404 may be modeled as a system with the following state equation:

$$x(k+1)=Ax(k)+Bu(k),$$

where x(k+1) is an n-dimensional state vector for a time k+1, u(k) is an input to the controller, and A and B are constant matrices of appropriate dimensions describing the system, such that the system is controllable and observable. The output equations for controller 404 are as follows:

$$y_1(k)=C_1x(k)+D_1u(k),$$

$$y_2(k)=C_2x(k)+D_2u(k),$$

$$y_3(k)=C_3x(k)+D_3u(k),$$

where each $y_i(k)$ is an output for the shared state controller and each $C_i$ and $D_i$ is a constant matrix of appropriate dimensions, tuned for the respective controller output. For example, $y_1(k)$ may be an output for a settle controller, $y_2(k)$ may be an output for a track follow controller, and $y_3(k)$ may be an output for an RV controller.

The output equation for shared state controller 404 is determined by switching module 402. In the depicted example, the switching module switches between the settle controller, the track follow controller, and the RV controller. The constant matrices are stored in memory 410. Depending upon the controller selected, the shared state controller loads the corresponding constant matrices. For example, if the settle controller is selected, the shared state controller loads $C_1$ and $D_1$. Similarly, if the track follow controller is selected, the shared state controller loads $C_2$ and $D_2$. And if the RV controller is selected, the shared state controller loads $C_3$ and $D_3$. Thus, the resulting output may be optimized for settle, track follow, RV, or any other performance parameter based upon a set of inputs.

Figure 5:
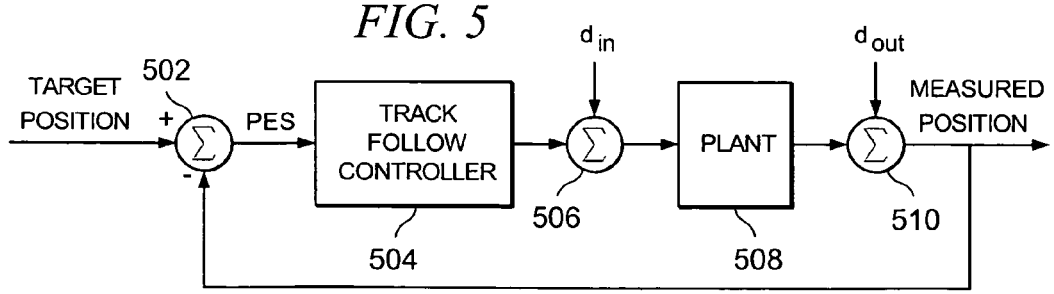
FIG. 5 is a control diagram for a traditional track follow controller.

With reference to FIG. 5, a control diagram is shown for a traditional track follow controller. Plant 508 is provided with command input and outputs a position signal. In the depicted example, plant 508 consists of actuators for head position adjustment. Track follow controller 504 produces a control effort. The control effort is added to input disturbance $d_{in}$ at summing junction 506 to form the command input to plant 508. Output disturbance $d_{out}$ is added to the position signal at summing junction 510 to form a measured position. Disturbance consists of, for example, torque disturbance, flutter, external vibrations, and the like. A position error signal (PES) is output by summing junction 502, which subtracts the measured position from an expected target position. Track follow controller 504 determines the command input based upon the PES.

With reference now to FIG. 6, a control diagram for a shared state settle, track follow controller is shown in accordance with a preferred embodiment of the present invention. Plant 620 is provided with command input and outputs a position signal. In the depicted example, plant 620 consists of actuators for head position adjustment. The shared state controller of the present invention produces a control effort. The control effort is added to input disturbance $d_{in}$ at summing junction 618 to form the command input to plant 620. Output disturbance $d_{out}$ is added to the position signal at summing junction 622 to form a measured position.

A position error signal (PES) is output by summing junction 602, which subtracts the measured position from an expected target position. The PES is provided to switch 604 and state update 606. The state update determines a state vector for controllers 608, 610, 612. Switch 604 and switch 616 determine which controller will provide control output based upon the PES and other inputs. In the depicted example, controller 608 is an RV/LV optimized controller, controller 610 is a track follow controller, and controller 612 is a settle controller.

Turning to FIG. 7, a control diagram for switching in a shared state settle, track follow controller is shown in accordance with an exemplary embodiment of the present invention. Plant 726 is provided with command input and outputs a position signal. In the depicted example, plant 726 consists of actuators for head position adjustment. The shared state controller of the present invention produces a control effort. The control effort is added to input disturbance $d_{in}$ at summing junction 724 to form the command input to plant 726. Output disturbance $d_{out}$ is added to the position signal at summing junction 728 to form a measured position.

State update 714 determines a state vector for controllers 716, 718, 720. In the depicted example, controller 716 is an RV/LV optimized controller, controller 718 is a track follow controller, and controller 720 is a settle controller. The PES is provided to low pass filter 702 and then PES running average 704 is performed. Switch 708 selects one of RV/LV controller 716 and track follow controller 718 based on the PES running average, a threshold, and WFT recovery, etc. 706. For example, if the PES running average is less than a predetermined threshold, switch 708 may select track follow controller 718. On the other hand, if the PES running average exceeds the predetermined threshold, switch 708 selects RV/LV controller 716.

Switch 710 selects between settle controller 720 and the controller selected by switch 708 based upon the actuator state 712. For example, if the actuator is in a track follow state, switch 710 selects the controller selected by switch 708. Alternatively, if the actuator is in a settle state, switch 710 selects settle controller 720. Switch 722 provides the selected controller output to the plant.

Figure 8:
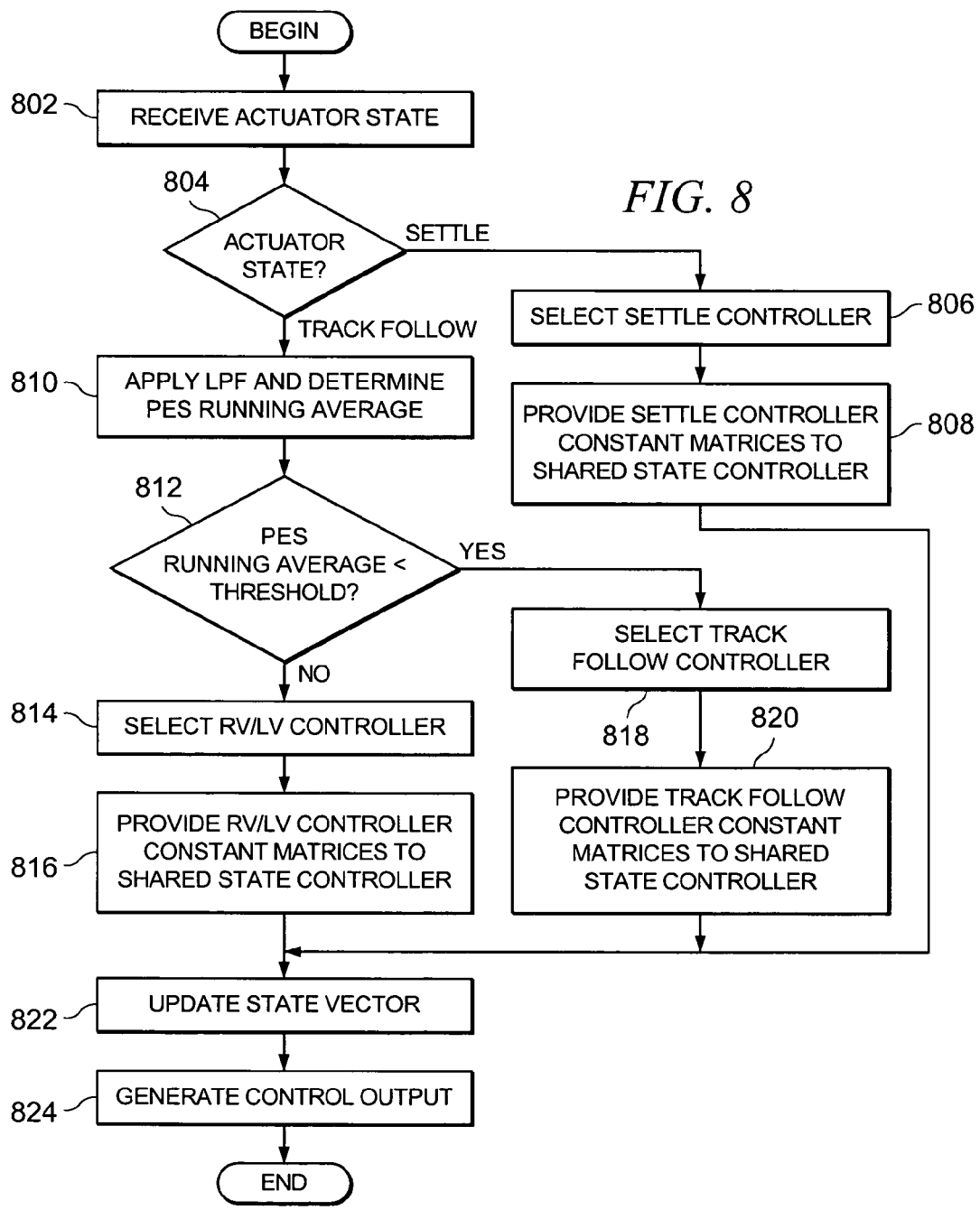
FIG. 8 is a flowchart illustrating the operation of a shared state settle, track follow controller in accordance with an exemplary embodiment of the present invention.

FIG. 8 is a flowchart illustrating the operation of a shared state settle, track follow controller in accordance with an exemplary embodiment of the present invention. The process begins and receives an actuator state (step 802). A determination is made as to whether the actuator state is settle or track follow (step 804). If the actuator state is settle, the process selects the settle controller (step 806) and provides settle controller constant matrices to the shared state controller (step 808).

If the actuator state is track follow in step 804, the process applies a low pass filter on the PES and determines a PES running average (step 810). Next, a determination is made as to whether the PES running average is less than a predetermined threshold (step 812). If the PES running average is less than the predetermined threshold, the process selects the RV/LV controller (step 814) and provides the RV/LV controller constant matrices to the shared state controller (step 816). If the PES running average is not less than the predetermined threshold in step 812, the process selects the track follow controller (step 818) and provides the track follow controller constant matrices to the shared state controller (step 820).

After the constant matrices are provided to the shared state controller in step 808, step 816, or step 820, the process updates the state vector (step 822) and generates a control output (step 824) by calculating an output equation, given the appropriate constant matrices. Thereafter, the process ends. The process in FIG. 8 through time and the control output is switched as the actuator state or PES running average change through time.

Thus, the shared state controller in the illustrative examples of the present invention solves the disadvantages of the prior art by providing a shared state controller with an output that may be optimized for a plurality of performance requirements. The shared state controller of the present invention improves NRRO, settle performance, track per inch (TPI) capability, and yield. The exemplary embodiment of the present invention maintains RV performance by switching from track follow to an RV controller. The shared state controller of the present invention does not require an external PID controller, blending schemes, additional MIPS, or additional memory requirements. Furthermore, the shared state controller offers a seamless transition from settle to track follow.

Figure 9:
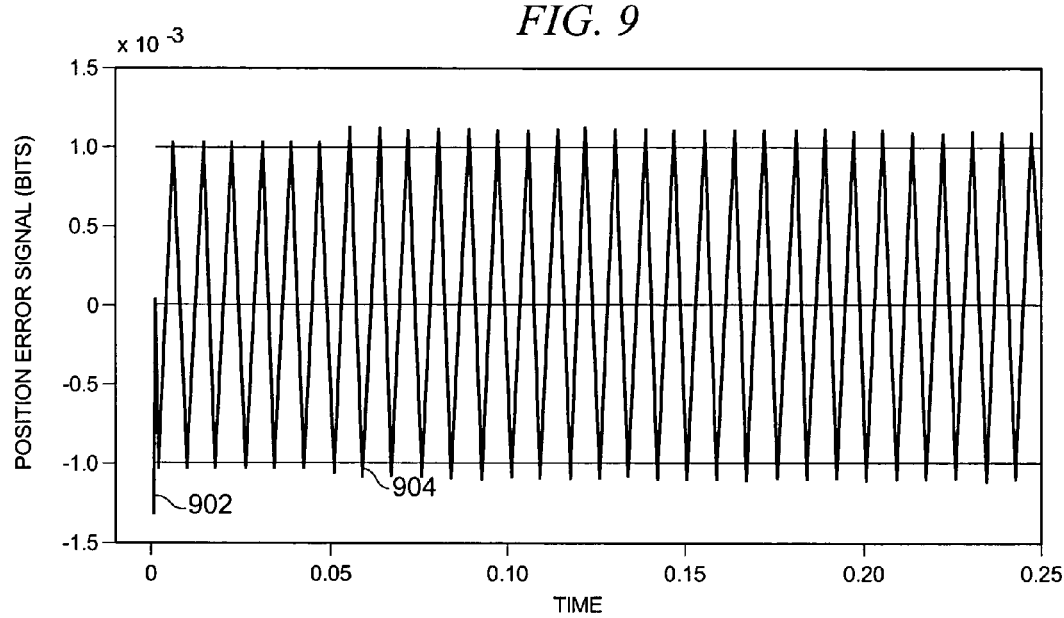
FIG. 9 is an exemplary diagram illustrating position error signal with shared state update controllers.

FIG. 9 is an exemplary diagram illustrating position error signal with shared state update controllers. As shown in FIG. 9, 902 shows that the effect of state initialization can be observed in the PES. The change in the PES after output is switched to output 2 is shown at 904. As illustrated in FIG. 9, no transient is present in the PES.

Figures 1, 10:
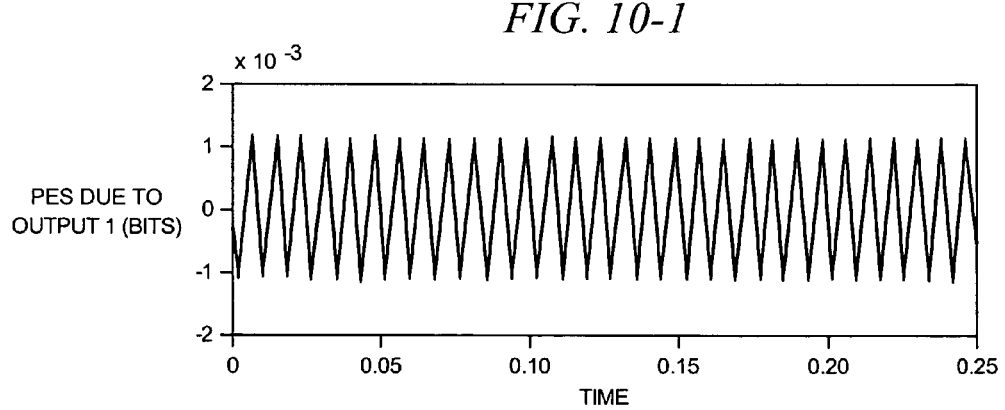
Figures 2, 10:
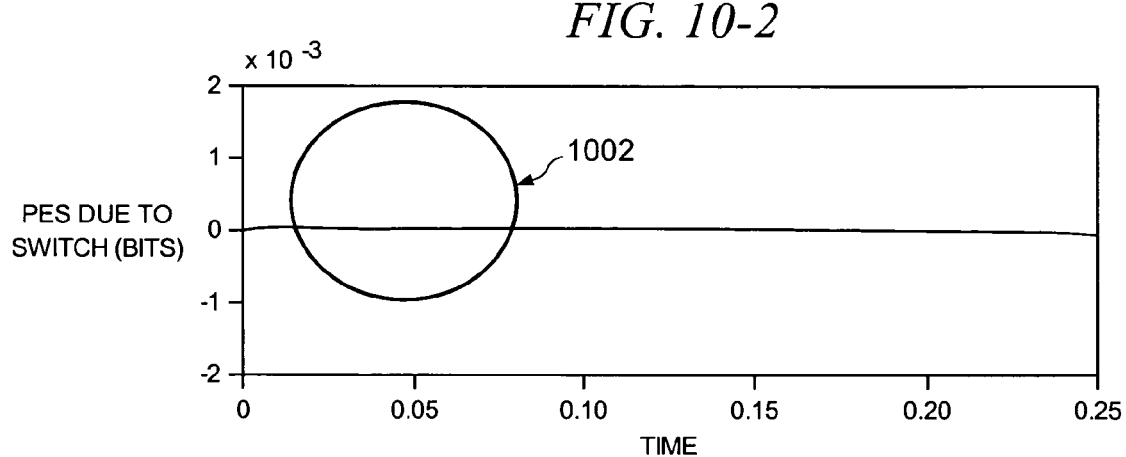
Figures 3, 10:
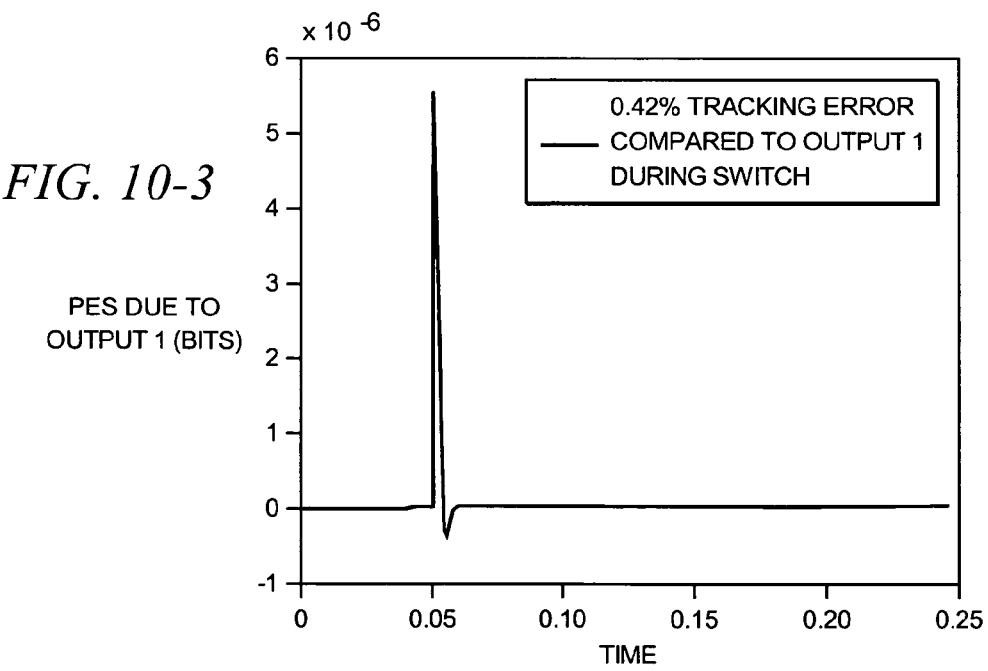

FIGS. 10-1, 10-2, and 10-3 are exemplary diagrams illustrating the output change versus tracking error. FIG. 10-3 is a magnified version of portion 1002 in FIG. 10-2. The transition error is less than 0.5% of total PES with respect to output 1. Note that 0.5% is not in terms of percentage of track, but relative to PES sigma.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disc, a hard disc drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. The present invention has application to robotics, gantries, cranes, davits and other moveable arms that are controlled to seek or follow positions or locations.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising steps of:
   (a) determining an actuator state;
   (b) responsive to the actuator state being a settle state, providing constants for a settle controller;
   (c) responsive to the actuator state being a follow state, providing constants for a follow controller, including selecting a first controller from a plurality of controllers based on whether a position error signal running average exceeds a predetermined threshold; and
   (d) generating a control output using the constants provided in step (b) or (c).

2. The method of claim 1 wherein the first controller is optimized for a first performance requirement.

3. The method of claim 2 wherein the first performance requirement is one of rotational/linear vibration and non-repeatable runout.

4. The method of claim 2 wherein the first performance requirement is rotational vibration.

5. The method of claim 4 wherein selecting a first controller from a plurality of controllers includes:
   applying a low pass filter to a position error signal before determining the position error signal running average.

6. The method of claim 1, further comprising:
   determining a controller state for the settle, track follow controller.

7. The method of claim 6 wherein the controller state is determined using the following state equation:

$$x(k+1)=Ax(k)+Bu(k),$$

where x(k+1) is an n-dimensional controller state vector for a time k+1, u(k) is an input to the controller, and A and B are constant matrices of appropriate dimensions.

8. The method of claim 7 wherein the control output is generated using the following equation:

$$y(k)=Cx(k)+Du(k),$$

where y(k) is an output for the settle, track follow controller and C and D are constant matrices of appropriate dimensions, including the constants provided in step (b) or (c).

9. The method of claim 1 wherein providing constants includes providing a reference to a storage location f or the constants in a memory.

10. A method for optimizing a controller, comprising steps of:
    (a) determining an actuator state;
    (b) responsive to the actuator state being a settle state, providing constants to control the controller as a settle controller;
    (c) responsive to the actuator state being a track follow state, providing constants to control the controller as a track follow controller, including selecting a first controller from a plurality of controllers based on whether a position error signal running average exceeds a predetermined threshold; and
    (d) generating a control output using the constants provided in step (b) or (c).

11. The method of claim 10 wherein the first controller is optimized for a first performance requirement.

12. The method of claim 11 wherein the first performance requirement is one of rotational/linear vibration and non-repeatable runout.

13. The method of claim 11 wherein the first performance requirement is rotational vibration.

14. The method of claim 13 wherein selecting a first controller from a plurality of controllers includes:
    applying a low pass filter to a position error signal before determining the position error signal running average.

15. The method of claim 10, the method further comprising:
    determining a controller state for the settle, track follow controller.

16. An apparatus comprising:
    (a) at least one actuator;
    (b) a memory; and
    (c) a shared state controller, operatively coupled to the at least one actuator and the memory, to determine a controller state, select a first controller from a plurality of controllers based on whether a position error signal running average exceeds a predetermined threshold, receive constants for the first controller from the memory, generate a control output using the constants, and provide the control output to the at least one actuator.

17. The apparatus of claim 16 wherein the first controller is optimized for a first performance requirement.

18. The apparatus of claim 17 wherein the first performance requirement is one of settle, rotational/linear vibration, and non-repeatable runout.

19. The apparatus of claim 16 wherein the controller state is determined using the following state equation:

$$x(k+1)=Ax(k)+Bu(k),$$

where x(k+1) is an n-dimensional controller state vector for a time k+1, u(k) is an input to the controller, and A and B are constant matrices of appropriate dimensions.

20. The apparatus of claim 19 wherein the control output is generated using the following equation:

$$y(k)=Cx(k)+Du(k),$$

where y(k) is an output for the settle, track follow controller and C and D are constant matrices of appropriate dimensions, including the constants provided in step (b) or (c).

* * * * *